United States Patent
Boothe et al.

[15] 3,678,110
[45] July 18, 1972

[54] FLUOROCARBON CONTAINING DIALLYLAMINES

[72] Inventors: Jerry E. Boothe, Pittsburgh; Merwin F. Hoover, Bethel Park; Dallas L. Schlegg, Pittsburgh, all of Pa.

[73] Assignee: Calgon Corporation, Pittsburgh, Pa.

[22] Filed: Nov. 20, 1969

[21] Appl. No.: 877,556

Related U.S. Application Data

[62] Division of Ser. No. 786,747, Dec. 24, 1968, abandoned.

[52] U.S. Cl. ............260/567.6 M, 260/86.1 N, 260/88.1 PN, 260/85.5 AM, 260/89.7 N, 260/453 R, 260/456 A, 260/459, 260/482 R, 260/482 C, 260/501.15, 117/161 P

[51] Int. Cl. ........................................................C07c 83/00

[58] Field of Search ................260/89.7, 567.6, 501.15, 458, 260/459

[56] References Cited

UNITED STATES PATENTS 3,288,770  11/1966  Butler ............................260/89.7 N X
3,461,163   8/1969  Boothe............................260/567.6 M Primary Examiner—Leon Zitver
Assistant Examiner—Michael W. Glynn
Attorney—William L. Krayer

[57] ABSTRACT

Diallyl quaternary ammonium compounds containing a terminal perfluoroisopropoxide group are disclosed. These compounds are useful in monomeric form and especially in polymeric form as oil and water repellents.

3 Claims, No Drawings

FLUOROCARBON CONTAINING DIALLYLAMINES

This case is a division of application, Ser. No. 786,747, filed Dec. 24, 1968 now abandoned.

BACKGROUND OF THE INVENTION

This invention relates to novel diallyl quaternary ammonium compounds containing a terminal perfluoroisopropoxide group and polymers thereof.

This invention further relates to the treatment of fibrous materials, especially textiles, with the compounds of this invention to impart to such fibers oil and water repellency characteristics.

Many types of fluorinated compositions had been proposed and used in the past for oil and water repellency. See, for example, U.S. Pat. Nos. 3,336,157; 3,293,306; 3,207,730. There are many others. Most such disclosures which are directed particularly to polymers containing fluorinated (or perfluoro) groups are constructed from monoethylenically unsaturated monomers such as acrylic or vinyl monomers.

The polymerization mechanism of diallyl ammonium monomers is described in an article by Butler and Angelo, J.A.C.S. 79 3128 (1957). See also U.S. Pat. No. 3,288,770. They may be copolymerized with certain acrylic monomers as in U.S. Pat. No. 2,923,701, and with sulfur dioxide as in Harada and Katayama, U.S. Pat. No. 3,375,233. Certain fluorinated amines have also formed polymers with sulfur dioxide as in Wright and Friedlander's U.S. Pat. No. 3,072,616.

The majority of fluorinated compositions have a fluorinated carbon chain of at least four carbons terminated by a $-CF_3$ group. Most of the repellency properties of such compounds are provided by the terminal $CF_3$. The trifluoro methyl group lowers the critical surface tension at the air-fiber interface. A perfluoroisopropoxide group contains two $CF_3$ groups. It has a greater percentage of its fluorine atoms incorporated in the lower energy $-CF_3$ groups. Therefore a compound containing a terminal perfluoroisopropoxide group would have a low critical surface tension value and good repellency characteristics.

Perfluoroisopropyl groups have been successfully incorporated into polymers. For example, see U.S. Pat. No. 3,361,685 where Pittman discloses glycidyl ethers and polymers thereof which contain terminal perfluoroisopropyl groups. See also Pittman U.S. Pat. No. 3,382,222 which discloses allyl ethers and polymers thereof containing a terminal perfluoroisopropyl group. The wetting characteristics of these groups are described by Pittman, Sharp and Ludwig in the *Journal of Polymer Science*, Volume 6, Part A-1, 1,729–1,751 (1968).

SUMMARY OF THE INVENTION

We have invented a series of fluorine compositions which are different from compositions of the prior art. They are quaternary ammonium compounds containing two allyl groups and at least one terminal perfluoroisopropoxide group.

Our novel compositions are compounds of the formula $$(CF_3)_2CFO-R_1-\overset{R}{\underset{\oplus}{N}}-(CH_2CH=CH_2)_2$$

$$X^\ominus$$

where $R_1$ is a bridging group selected from the group consisting of $$-O-, -\overset{O}{\underset{\parallel}{C}}-, -SO_2-, -NR_2\overset{O}{\underset{\parallel}{C}}-, -NR_2SO_2-$$

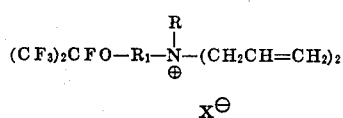

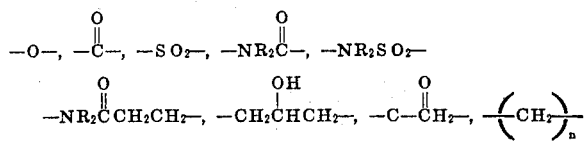

where n is an integer from 1 to 8 and $R_2$ is selected from the group consisting of H and alkyl and alkanol groups of from one to four carbon atoms; R is selected from the group consisting of H, $R_1-OCF(CF_3)_2$, and alkyl and alkanol groups having from one to four carbon atoms; $X^\ominus$ is an anion selected from the group consisting of $F^\ominus$, $Cl^\ominus$, $Br^\ominus$, $I^\ominus$, $CH_3SO_3^\ominus$, and $CH_3COO^\ominus$.

We have found that such compounds having two allyl groups attached to the nitrogen may be polymerized into high molecular weight linear polymers in a manner similar to that disclosed by Butler in U.S. Pat. No. 3,288,770. They also form high molecular weight products by copolymerization with compounds of the type used by Butler, that is, dialkyl diallyl ammonium compounds.

The compounds of our invention may be copolymerized with monomers which are well known and used in the art of repellency finishes. Examples of these are the diethylenically unsaturated monomers such as butadiene, isoprene, and chloroprene. Some examples of useful monoethylenically unsaturated monomers are diacetone acrylamide, styrene, acrylonitrile, and lower alkyl acrylates containing alkyl groups of from one to 10 carbon atoms.

The monomers of our invention may be made by the syntheses indicated.

EXAMPLE I

1. $(CF_3)_2C=O + KF \longrightarrow (CF_3)_2CFOK$
2. $(CF_3)_2CFOK + Br(CH_2)_nBr \longrightarrow (CF_3)_2CFO(CH_2)_nBr$
3. $(CF_3)_2CFO(CH_2)_nBr + CH_3N(CH_2CH=CH_2)_2 \longrightarrow$

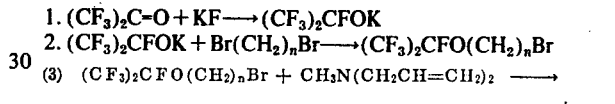

Example II (1) $(CF_3)_2C=O + KF \longrightarrow (CF_3)_2CFOK$ (2) $(CF_3)_2CFOK + Cl-\overset{O}{\underset{\parallel}{C}}-CH_2-Cl \longrightarrow (CF_3)_2CFO\overset{O}{\underset{\parallel}{C}}CH_2Cl$ (3) $(CF_3)_2CFO\overset{O}{\underset{\parallel}{C}}CH_2Cl + CH_3N(CH_2CH=CH_2)_2 \longrightarrow$

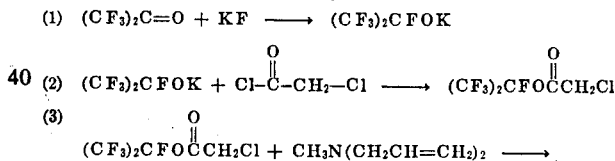

(1) $(CF_3)_2C=O + KF \longrightarrow (CF_3)_2CFOK$ (2) $(CF_3)_2CFOK + \overset{O}{\overset{\triangle}{CH_2CHCH_2Cl}} \longrightarrow$ $(CF_3)_2CFOCH_2CHOHCH_2Cl$ (3) $(CF_3)_2CFOCH_2CHOHCH_2Cl + CH_3N(CH_2CH=CH_2)_2 \longrightarrow$

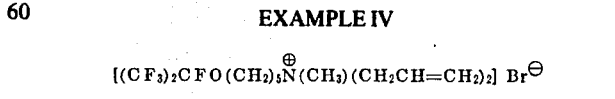

Specific examples of the syntheses are

EXAMPLE IV $[(CF_3)_2CFO(CH_2)_5\overset{\oplus}{N}(CH_3)(CH_2CH=CH_2)_2]\ Br^\ominus$ To a 2-liter steel cylinder was added 58 g. (1.0 mole) of dry KF. The cylinder was fitted with a pressure gauge and valve, evacuated, and 116 g. (1.0 mole) of hexafluoroacetone and 618 g. of $CH_3CN$ was added. The mixture was mixed by shaking for 0.5 hours and 1,150 g. (5.0 moles) of 1,5-dibromopentane was added. The reaction mixture was heated at 80° for 72 hours, then distilled yielding 269 g. of $(CF_3)_2CFO(CH_2)_5Br$, b.p. 94°–96°/42 mm. This compound was then analyzed for percent C, H, Br and F.

Theoretical: C=28.6%; H=3.0%; Br=23.9%; F=39.7%
Actual: C=28.7%; H=2.9%; Br=24.0%; F=39.8%

To a 200-ml. Pyrex resin flask was added 49.6 g. (0.15 mole) of $(CF_3)_2CFO(CH_2)_5Br$ and 94.1 g. (0.85 mole) of $CH_3N(CH_2CH=CH_2)_2$. The mixture was heated at 112° for 18 hours and after removing unreacted starting materials under vacuum 58 g. of solid $(CF_3)_2CFO(CH_2)_5N(CH_3)(CH_2CH=CH_2)_2Br^{\ominus}$ was obtained.

EXAMPLE V

Similar to Example IV, $(CF_3)_2CFOK$ and 1,4-dibromobutane were heated to 80° in $CH_3CN$ for 80 hours, then distilled yielding $(CF_3)_2CFO(CH_2)_4Br$, b.p. 87°/55 mm.

Reaction of $(CF_3)_2CFO(CH_2)_4Br$ with $CH_3N(CH_2CH CH_2)$ yielded

The compositions of our invention may be used for repellency in the monomeric form or polymeric form. We have homopolymerized the compounds of our invention. An example of the polymerization is set forth in the following:

EXAMPLE VI

Homopolymerization of 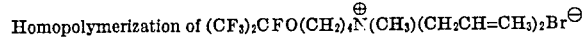

Seventy-five grams of a 40 percent monomer solution (30 gm. of active monomer, 0.0695 moles) was placed in a 250 ml reaction flask. The solution was purged for 1 hour at 25° C. and the temperature raised to 80° C. Ammonium persulfate catalyst was introduced at a rate of 0.1 moles catalyst per mole monomer per minute for a period of 1 hour. The catalyst addition was then terminated and the reaction mixture held at 94° C. for 1 hour. The reaction mixture was then cooled to room temperature and the polymer isolated.

The compounds of our invention can be applied to the fiber by means such as padding. Application can also be accomplished by dipping, spraying, and other methods used in the art. The compounds can be applied from dispersions, emulsions or solutions depending on the application techniques used. The compounds of our invention can be formulated with fluorocarbon extenders such as Phobetex.

The necessary amount of compound add-on (weight of dry compound on fiber or percent WOF) is difficult to ascertain. This amount depends on such factors as the repellency properties desired in finished product. The compounds of our invention are effective over a wide range of add-ons. However the optimum conditions are achieved with add-ons between 0.5 percent and 10 percent by weight of dry compound on fiber.

The polymers of our invention have a wide range of composition. The composition is determined by the desired oil and water repellency properties which are to be imparted to the fiber. In many cases only a small weight percent of fluorinated group is necessary to achieve measurable repellency properties. However we have found that the polymer should contain at least 5 percent by weight units of the fluorinated group to impart a practical oil and water repellency to most fibers. The remainder of the polymer composition consists of comonomers which are well known and used in the art of repellency finishes. Examples are the diethylenically unsaturated monomers such as butadiene, isoprene, and chloroprene. Some examples of useful monoethylenically unsaturated comonomers are styrene, acrylonitrile, and the lower alkyl acrylates and methacrylates having alkyl groups of one to 10 carbon atoms.

We do not intend to be restricted to the above specific examples and illustrations. Our invention may be otherwise practiced within the scope of the following claims.

We claim:

1. Compounds of the formula

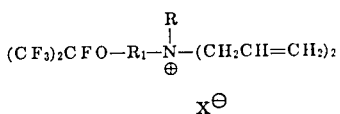

where "$R_1$" is a bridging group selected from the group consisting of

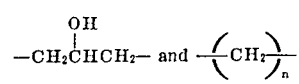

where $n$ is an integer from 1 to 8; "R" is selected from the group consisting of hydrogen and alkyl groups of one to four carbon atoms; "X" is an anion selected from the group consisting of $F^{\ominus}$, $Cl^{\ominus}$, $Br^{\ominus}$, $I^{\ominus}$, $CH_3SO_4^{\ominus}$, and $CH_3COO^{\ominus}$.

2. Compound of claim 1 where $R_1$ is

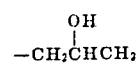

R is $CH_3$ and X is $Cl^{\ominus}$.

3. Compound of claim 1 where $R_1$ is $+CH_2+_n$ where $n$ is an integer from 1 to 5; R is $CH_3$ and "X" is $Cl^{\ominus}$.

* * * * *